United States Patent Office 2,844,236
Patented July 22, 1958

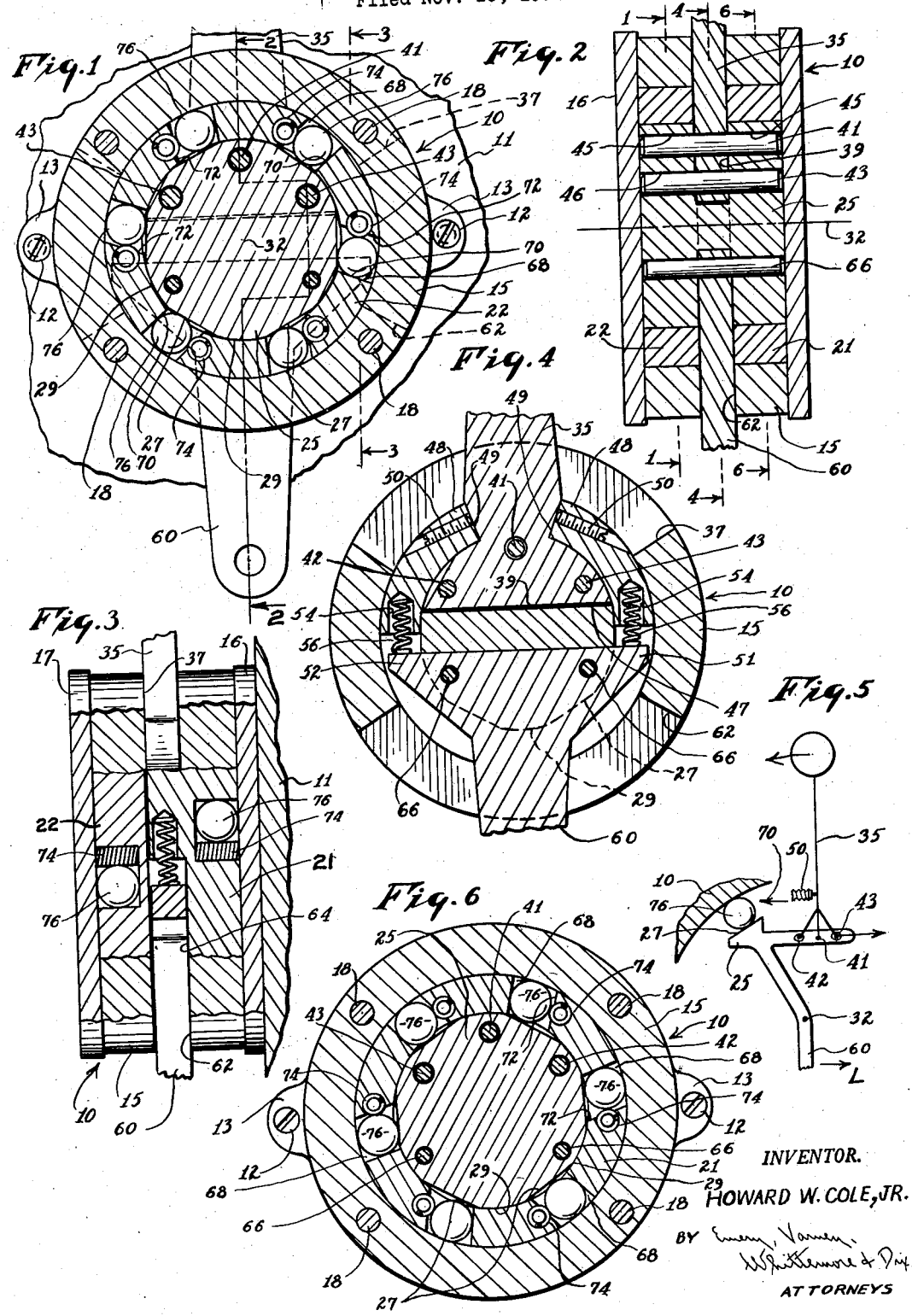

2,844,236

SELF-LOCKING ACTUATOR WITH LOAD RELEASE

Howard W. Cole, Jr., Mountain Lakes, N. J.

Application November 15, 1954, Serial No. 468,633

6 Claims. (Cl. 192—8)

This invention relates to self-locking actuators of the type in which a load is connected to a secondary lever which moves angularly in response to angular motion imparted to a primary lever, and in which the secondary lever automatically locks in any position to which it is moved.

In actuators of this type, the leverage system can not be moved by force applied to the secondary lever because the apparatus has two sets of locking elements which wedge against a fixed housing when motion is imparted to them by the secondary lever. By having the two sets of locking elements facing in opposite directions, one or the other set wedges, no matter which way the force is applied to the secondary lever.

The locking elements are forced out of their wedged positions by movement of the primary lever, but when they are tightly wedged, considerable force is necessary to release them.

It is an object of this invention to provide an improved, self-locking actuator of the character indicated, but with a new relation between the parts so that the primary actuator releases the force, or a substantial part of it, which holds the locking elements in their wedged positions. This makes it possible to release the locking elements with a small force, and manually operated actuators can be used for controlling airplane flaps and other loads which apply a heavy force to the secondary lever of the actuator.

Another object of the invention is to provide an improved, self-locking actuator of the type having two overrunning clutches facing in opposite directions and having circular locking elements that are wedged against a fixed housing by cam means connected to the secondary lever which is in turn connected to the load. It is a feature of the invention that the cam means which wedges the circular elements into locking position is eccentric of the axis about which the primary lever moves when operated to release the locking elements during the operation of the actuator to move the load into a different position. This eccentricity produces a couple which applies force in one direction to move the cam means away from the locking elements and in the other direction to move the locking elements away from the cam means.

Other objects, features and advantages of the invention will appear or be pointed out as the description proceeds.

In the drawing, forming a part hereof, in which like reference characters indicate corresponding parts in all the views:

Figure 1 is a vertical, sectional view through an actuator embodying this invention, the section being taken on the line 1—1 of Figure 2;

Figures 2 and 3 are sectional views taken on the lines 2—2 and 3—3, respectively, of Figure 1;

Figure 4 is a sectional view, similar to Figure 1, but taken on the line 4—4 of Figure 2;

Figure 5 is a diagram showing the way in which the forces are applied to the parts when the primary actuator is moved in a direction to release the locking elements of the actuator; and Figure 6 is a sectional view taken on the line 6—6 of Figure 2.

The actuator includes a fixed housing 10. This housing may be connected to a bulkhead or any other part of a vehicle or other structure in which the invention is to be used. The drawing shows the housing 10 connected to a bulkhead 11 by screws 12 which extend through brackets 13 attached to the housing. The housing 10 has a cylindrical portion 15 and has end plates 16 and 17, and there are screws 18 connecting the end plates to the cylindrical portion 15.

There are two cages 21 and 22 located within the housing 10. The peripheral surface of each of the cages is cylindrical and is a bearing surface which fits within a complementary bearing surface formed by the inside wall of the cylindrical portion 15 of the housing 10. The cages 21 and 22 are generally annular and they have inside surfaces which are cylindrical and which provide bearings for a cam element 25. This cam element has substantially flat cam surfaces 27 at angularly spaced regions around its periphery, and there are arcuate bearing surfaces 29 in the spaces between the cam surfaces 27. It is these arcuate bearing surfaces 29 which fit within the bearing provided by the inside surfaces of the cages 21 and 22. Thus the cages 21 and 22, and the cam element 25, are rotatable in the housing 10 about a common axis 32. This axis 32 is the longitudinal axis of the housing 10.

A primary lever 25 extends into the housing 10 through a slot 37 in the top of the housing. In the construction illustrated, this slot has an angular extent of approximately 125°. The primary lever 35 passes between confronting faces of the cages 21 and 22 and extends into a slot 39 in the top of the cam elements 25.

The lever 35 is connected to the cam element 25 by a center pin 41 and by two side pins 42 and 43. In the preferred construction, the pin 41 fits within the lever 35 and has a running fit in openings 45 in the cam element. This provides a large area of bearing surface for the pin 41 in the cam element 25.

The pins 42 and 43 are undersize pins. In the construction shown, these pins 42 and 43 have a press fit in the primary lever 35 and there is about .002 inch clearance between them and openings 46 through which they extend in the cam element 25. The purpose of this clearance is to provide a very limited lost motion which permits a slight rocking of the primary lever 35 about the axis of the pin 41 independent of any movement of the cam element 25. In practice, this lost motion can be very slight, and in some cases the resilience of the pins 42 and 43 is enough to provide the necessary lost motion. In such a case, the clearance around the pins 42 and 43 is not sufficient to make the pins noticeably loose in the openings 46.

The lower end of the primary lever 35 has a bottom face 47 (Figure 4) which is spaced slightly from the bottom face of the slot 39.

On each of the confronting faces of the cages 21 and 22, there is a projection 48 extending for a limited angular distance. The projection 48 of the cage 21 is on the right of the lever 35 in Figure 4, and the projection 48 of the cage 22 is on the left of the lever 35. Each of these projections 48 has an upper face 49 which confronts a face of the lever 35, the lever being shaped to obtain downwardly converging faces for confronting the radial faces 49 of the cage projections 48.

There is a set screw 50 threaded through each of the projections 48 in a direction to abut against the surface of the lever 35 which confronts the upper face 49 of the cage projection 48. These set screws 50 are adjusted to control the clearance between the lever 35 and the faces 49 of the cages. Thus the set screws 50 provide an adjustable lost motion between the lever 35 and the cages.

The lower faces of the respective projections 48 confront the top faces of lugs 51 and 52. There are recesses 54 in the faces of the projections 48 which are located above the lugs 51 and 52. A helical spring 56 is located in each of the recesses 54, and these springs 56 are compressed between the projections 48 and the top faces of the lugs 51 and 52.

The lugs 51 and 52 are on a secondary lever 60 which extends through a slot 62 in the bottom of the housing 10. This slot has an angular extent slightly less than the upper slot 37, and in the construction shown has an extent of approximately 115°. This lever 60 extends between confronting faces of the cages 21 and 22, and extends into a slot 64 in the lower half of the cam element 25. The secondary lever 60 is integrally connected to the cam element 25 by pins 66. Thus the secondary lever 60 and the cam element 25 move angularly as a unit about the center axis 32.

The cage 22 has a plurality of radially extending openings 68 (Figure 1) at angularly spaced locations. The drawing shows six openings 68. More or fewer openings can be used, but preferably not less than four. Each of the openings 68 has a front face 70 which is radial in the construction illustrated; and has a rearward face 72 with a socket for holding a cylindrical sleeve spring 74 which urges a ball 76 toward the front face 71 of the opening. The cylindrical sleeve spring 74 is representative of resilient means for urging the ball 76 toward the front face 70.

The balls 76 are the locking elements of the actuators. They are representative of circular elements located between the cam surfaces 27 and the inside face of the housing 10. Rollers can be used in place of the balls 76. Each of the balls 76 is preferably of a diameter to fill the space between the cam surface 27 and the inside bearing surface of the housing 10.

When the cam element 25 is rotated in a counter clockwise direction in Figure 1, the movement of the cam surface 27 wedges the locking elements 76 outwardly against the inside surface of the fixed housing 10 and this prevents further movement of the secondary lever 60. Because of the fact that the locking elements 76 are large enough to fill the space between the cam element and the housing 10 when the clutch elements are released, the only actual angular movement of the cam element and lever 60, required to wedge the elements 76 and to lock the actuator, results from resilience of the metal parts, since there is no clearance to be taken up.

When the cage 22 moves counterclockwise in Figure 1, the faces 70 push the locking elements 76 in a direction to counteract the wedging produced by the counterclockwise movement of the cam element, and this releases the wedging action of the locking elements 76. In prior constructions, in which the primary lever rocked about the same axis as the cam element 25, the force applied by the cage against the locking elements had to be sufficient to force the locking elements from their wedged positions against the full friction resulting from their pressure against the cam element and housing.

One outstanding advantage of the construction of this invention is that the movement of the primary lever to release the locking elements sets up a couple which relieves or reduces the pressure of the locking elements against the cam faces and the inside surface of the housing 10. The release of this pressure reduces the friction which must be overcome in order to move the locking elements 76 when releasing them. This action is clearly illustrated in Figure 5.

In Figure 5 the ball 76 is wedged between the face of the housing 10 and the cam surface 27 of the cam element 25. The direction of the load is indicated by the arrow marked by the letter "L." When the primary lever 35 is moved counterclockwise to release the ball 76, the lever exerts a pressure through the set screw 50 and cage face 70 against the ball 76.

Because of the fact that the connection of the lever 35 to the cam element 25 is above the axis 32 of the cam element, this movement of the lever 35 exerts a thrust to the right at the pin 41 and this tends to rotate the cam element 25 in a direction to release the load exerted by the cam face 27 against the ball 76. The effect is as though the set screw 50 served as a fulcrum for the lever 35 to move the pin 41 in a direction opposite to that in which the upper end of the lever 35 is moved by the manual or other releasing force applied to the lever.

The extent to which the load of the cam face 27, against the ball 76, is released depends upon the adjustment of the set screw 50. When this set screw is adjusted to provide very little lost motion between it and the lever 35, the pressure of the cam face 27 against the ball 76 is released by the time the lever 35 moves the ball cage and ball 76 into a new position. If the set screw 50 is backed away from the lever 35 so as to leave considerable lost motion, the pressure of the cam face 27 against the ball 76 will be only partially released depending upon the extent of the lost motion between the set screw 50 and the lever 35.

In practice it is often advantageous to adjust the apparatus so that there is some load exerted on the balls 76 by the cam faces 27 at all times so as to provide a residual friction for preventing the lever 35 from moving in response to vibration, with resulting movement of the secondary lever 60.

The lost motion at the pins 42 and 43 is to permit movement of the lever 35 far enough to actuate the particular cage which must be moved to unlock the group of wedged balls before the lever 35 transmits angular movement to the secondary lever 60.

Figure 6 shows the locking elements 76 which are located in the ball cage 21. The construction shown in Figure 6 is the same as that in Figure 5 except the over running clutch is turned in the opposite direction. The corresponding parts in Figure 6 are designated by the same reference characters as in Figure 1. It will be understood that when the secondary lever moves the cam element 25 in one direction, it wedges the balls 76 of Figure 1 against the inside face of the housing and when the cam element 25 is turned in the opposite direction it wedges the balls 76 of Figure 6 against the inside face of the housing 10. Each of the over running clutches is free at all times to move in one direction and for this reason two separate clutches are provided with each clutch oriented to lock when turned in a different direction from the other.

The preferred embodiment of the invention has been illustrated and described. Terms of orientation are, of course, relative. Various changes and modifications can be made, and some features can be used in different combinations without departing from the invention as defined in the claims.

What is claimed is:

1. A load actuator comprising a housing having inside bearing surfaces and having circumferentially extending slots therein, two overrunning clutches within the housing and facing in opposite directions, each of the overrunning clutches being at a different end of the housing and including a cage with angularly spaced openings therein for holding balls, a cam member located inward of the cages and having cam faces thereon in position to wedge the balls against said bearing surfaces when the cam member moves with respect to either cage in the direction to lock the overrunning clutch of that cage, a primary lever extending through one of the slots and into the housing between the cages, confronting faces of the primary lever and each of the cages providing abutments through which motion of the primary lever in one direction or the other rotates one or the other of the cages, a secondary lever extending through the other slot in the housing and secured to the cam member to form a unitary assembly movable on a bearing surface in the housing about an axis of rotation, and a pivot bearing carried by said assembly and on which the primary lever is angularly movable about an axis eccentric of said axis of rotation of the assembly and a lost motion connection between the primary lever and said assembly for limiting the angular movement of the primary lever about said pivot bearing.

2. The load actuator described in claim 1, and in which the abutments through which the primary lever actuates the cages are spaced from one another to provide some lost motion between the primary lever and the cages.

3. The load actuator described in claim 1, and in which the abutments through which the primary lever actuates the cages are spaced from one another to provide some lost motion between the primary lever and the cages, and adjustable means for regulating and eliminating the amount of lost motion provided between the primary lever and the abutments.

4. A load actuator comprising a housing having an inside bearing surface, two over-running clutches located within the housing and oriented in opposite directions, the clutches being spaced from one another axially in the housing, and each of the clutches including a separate cage with angularly spaced openings therein and rolling elements in said openings, a cam member in the housing, the cam member and the cages being rotatable in the housing about a cam axis, the cam member being located in position to contact with the rolling elements of both clutches and having cam faces thereon in position to wedge the rolling elements of one or the other of the overrunning clutches against the housing when the cam member is moved with respect to the cages in one direction or the other about its axis of rotation, a primary actuator connected to the cam member by a pivot connection about which the primary actuator has angular movement about an axis eccentric of the axis of the cam member and the cages, abutting surfaces carried by the primary actuator and the cages in position to contact with one another to transmit motion from the primary actuator to the cages, a secondary actuator secured to the cam member and forming a unitary assembly with the cam member for movement therewith about the axis of rotation of the cam member, and a lost motion connection between the primary lever and said assembly for limiting the angular movement of the primary lever about said pivot connection.

5. The self-locking operator described in claim 4, and in which there is a lost motion connection between the primary actuator and the cages that move each group of clutch elements as a unit with the cam faces.

6. The self-locking actuator described in claim 4 and in which the primary actuator is connected with the secondary actuator through the lost-motion connection, and there is another lost-motion connection between the primary actuator and the cages that move the clutch elements as a unit, and at least one of the lost-motion connections includes means for adjusting the amount of lost motion.

References Cited in the file of this patent

UNITED STATES PATENTS

| | | |
|---|---|---|
| 2,458,446 | Suska | Jan. 4, 1949 |
| 2,559,960 | Houplain | July 10, 1951 |
| 2,660,902 | Wagner | Dec. 1, 1953 |

FOREIGN PATENTS

| | | |
|---|---|---|
| 633,274 | France | Oct. 22, 1927 |